United States Patent [19]

Gartner

[11] 4,298,475

[45] Nov. 3, 1981

[54] WATER PURIFICATION SYSTEM

[76] Inventor: William J. Gartner, 153 Williamsburg Dr., Bartlett, Ill. 60103

[21] Appl. No.: 170,023

[22] Filed: Jul. 18, 1980

[51] Int. Cl.$^3$ ............................................. B01D 29/08
[52] U.S. Cl. .................................... 210/266; 210/282
[58] Field of Search ............... 210/266, 282, 501, 502, 210/283, 284, 287, 290; 424/79, 150

[56] References Cited

U.S. PATENT DOCUMENTS

| 1,000,332 | 8/1911 | Dyer | 210/251 |
|---|---|---|---|
| 1,333,011 | 3/1920 | Crady | 210/251 |
| 3,327,859 | 6/1967 | Pall | 210/502 |
| 3,389,803 | 6/1968 | Barley | 210/282 |
| 3,392,837 | 7/1968 | Sanzenbacher | 210/282 |
| 3,715,035 | 2/1973 | Teeple et al. | 210/249 |
| 3,923,665 | 12/1975 | Lambert et al. | 210/501 |

Primary Examiner—Ivars C. Cintins
Attorney, Agent, or Firm—Robert E. Wagner; Ralph R. Rath

[57] ABSTRACT

A portable water purifier is described comprising an elongated tube having a filtering agent, a bactericidal agent and an adsorbent material retained in the tube. The user supplies suction from the mouth to draw water through the tube for filtering out foreign material and purifying the water prior to use.

2 Claims, 2 Drawing Figures

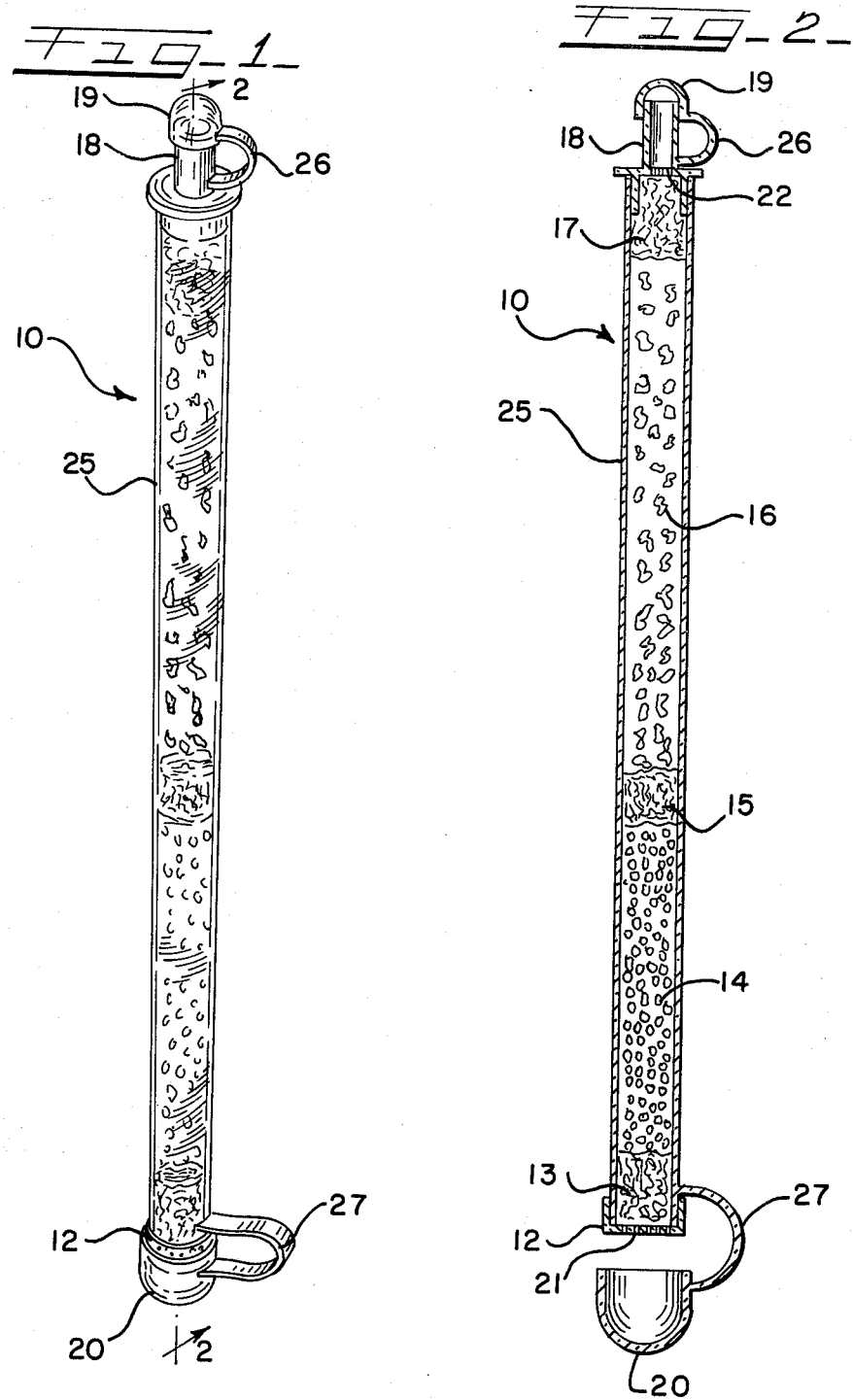

WATER PURIFICATION SYSTEM

DESCRIPTION

Technical Field

This invention relates to water purification systems and, in particular, to a personal portable water purifier.

Background of the Prior Art

As the environment becomes more polluted, and lakes, rivers and streams become endless cesspools, a camper or hunter soon realizes the necessity for carrying his own personal supply of water to avoid the necessity of exposing himself to the dangers of drinking polluted water.

Various practices have become commonplace in searching for drinking water, including boiling the water prior to drinking, and dissolving iodoform tablets into the water. Boiling water requires time and equipment, neither of which may be available when the water is required. In addition, the water tastes flat as a result of the boiling. The iodoform tablets produce an undesirable taste and have traditionally been unpopular for that reason. Other water purification devices have been either too large or too heavy or have rendered the water quite distasteful. Some apparatus have limited capacity and can allow the passage of water even when its purification capacity is exhausted, and allowing a user to drink contaminated water without knowledge of that fact.

Summary of the Invention

Therefore, an object of the subject invention is a portable water purifier with a product that is pleasant to the taste.

Another object of the subject invention is a water purifier with a capacity to purify and disinfect the water greater than the filtering capacity of the purifier.

Still another object of the subject invention is a portable water purifier which may be stored and periodically used for periods up to a year while retaining its effectiveness.

These and other objects are attained in accordance with the present invention wherein there is provided an elongated tube which may be capped at both the inlet and outlet ends, with filter and purification materials intermediate. Bactericidal resin particles purify the water while a granular absorbent material, such as activated carbon and the like, adsorbs the other impurities which produce odor and taste. Filter media within the tube removes substantially all suspended particle matter in the water, resulting in clear, purified water emanating from the tube.

Brief Description of Several Views of Drawings

Further objects of the invention together with additional features contributing thereto and advantages accruing therfrom will be apparent from the following description of one embodiment of the invention when read in conjunction with the accompanying drawings wherein:

FIG. 1 is a perspective view of one embodiment of the subject invention;

FIG. 2 is a cross-sectional view taken along lines 2—2 of FIG. 1 showing the internal components of the water purifier of the subject invention.

Detailed Description

Referring now to FIG. 1, there is shown the water purification apparatus 10 comprising one embodiment of the invention. The water purification apparatus comprises a long, slender tube which may be formed of either glass, plastic or metal as desired. The tube is much in the nature of a drinking straw having a diameter of such size for insertion into a user's mouth for applying suction. As shown in FIG. 2, the tubing is preferably formed of plastic allowing it to be formed of inexpensive material. If desired, the plastic may be transparent polycarbonate in order to provide a visual sighting of the contents of the tube. In this manner, through change in color and other means of indication, it would be possible to provide a visual reference of the effectiveness of the purifying and filtration agents in the tube 25.

As shown in FIG. 2, the tube 25 has an inlet 12 and an outlet 18. The inlet 12 has perforations 21 which allow the flow of water into the tube 25 while retaining the filtration material 13 inside the tube. Similarly, perforations 22 allow the flow of purified water from the tube while retaining the filtration material 17 inside. Caps 20 and 19 are attached by straps 27 and 26, respectively, to the tube ends 12 and 18 and may be used for preventing leakage when the purifier of the subject invention is not in use, while additionally keeping the mouthpiece 18 clean. As stated, the inlet cap 12 has perforations 21 to allow the easy flow of water into the tube 25. Adjacent inlet cap 12, inside the tube, is a primary filter material such as polyester filter fiber, which removes much of the suspended particulate matter in the incoming water. Other filtering agents or materials may be used as found appropriate. Adjacent the primary filter material 13 is purifying medium 14. Preferably, the purifying medium 14 is an iodinated cation exchange resin capable of purifying and disinfecting the incoming water, thereby instantaneously killing harmful bacteria as the water comes into contact with the resin. Commercially, an appropriate purifying medium is generally known as triiodide resin. Other bactericidal mediums may be used as desired.

Adjacent the purifying resin 14 is a secondary or intermediate filtration area containing filtration material 15 similar to the filtration material 13. If desired, filtration material 15 may provide a finer mesh size for screening out smaller particles.

Adjacent the second filtration area 15 is a granular absorbent material having a large surface area, such as activated carbon and the like, which can adsorb impurities, organic liquids, gases, tastes and odors, making the water palatable. As is known, certain other hydrocarbon material which may pass through the purifying material 14 will be adsorbed onto the activated carbon. A final segment of filter media 17 removes substantially all the remaining particulate matter prior to the exit of the now-cleansed water through end cavity 18. As with the intermediate filter material, a finer mesh size than the primary filter material may be used. On passing through each of the filter areas and the purifying and adsorbing material results in a crystal-clear, bacteria- and virus-free, good tasting water, when used with a non-saline source. According to tests required under Federal Law, water containing 200,000–300,000 escherichia-coli micro-organisms per milliliter has been run through the water purification unit of the subject invention and the effluent from the unit contains less than one micro-organism per 100 milliliters. In addition, the subject invention has been tested with raw sewage, river water, urine, etc., in all cases, a clear, colorless, good tasting bacteria- and virus-free water was the final product.

In the use of the subject invention, the end caps 19 and 20 are removed from opposing end portions 12 and 18, respectively, and the inlet portion 12 is inserted into the source of water, such as a pond or river. The user places his mouth over the mouthpiece 18 and, much as in the nature of a straw, sucks the water inward, past the filtering and purifying media within, into his mouth. Since a majority of the tube is filled with a purifying medium 14 and the adsorbent medium 16, the useful life of the subject invention is determined principally by the length of time and periods of use required for the inlet filter 13 to become clogged. Thus, unless contaminated water with relatively little suspended particle matter is a constant source for purification through the subject invention, the inlet filter 13 will be clogged long before the purifying capacity of the tube of the subject invention is exhausted. With the clogging of the inlet filter 13, there can be no passage of water through the tube 25 and the user will realize that the usefulness of the tube of the subject invention has been spent and should be discarded at that time. Because of the inexpensive nature of the subject invention, it is disposable in nature and, therefore, may then be tossed into the nearest waste receptacle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended Claims.

I claim:

1. A portable water purifying apparatus for treating contaminated water to provide drinking water solely from the passage of said contaminated water through said apparatus comprising an elongated tube having a diameter of a size as to allow suction to be applied by a user's mouth, said tube having an interior conduit connecting an upper outlet and a lower inlet, said conduit having successive adjacent sections from said inlet and said outlet, a first section containing a primary filter means for removing particulate matter, a second section containing a halogenated ion exchange resin for removing harmful bacteria, viruses and the like, a third section containing a secondary filtration material for removing additional particulate material, a fourth section containing activated carbon granules for removing undesirable odors, tastes and hydrocarbons, and a fifth section containing a secondary filter means for removing substantially all remaining particulate matter, whereby on the application of said suction when said lower inlet is inserted into a source of contaminated water, said contaminated water is treated to permit the ingestion of water directed from said upper outlet.

2. The water purifying apparatus of claim 1 further including cap means on each of said inlet and outlet for sealing said apparatus when not in use.

* * * * *